Feb. 12, 1963   F. H. ROHR ETAL   3,077,533
NOVEL FRAMEWORK FOR HONEYCOMB CORE MACHINE
Filed April 17, 1961   2 Sheets-Sheet 2
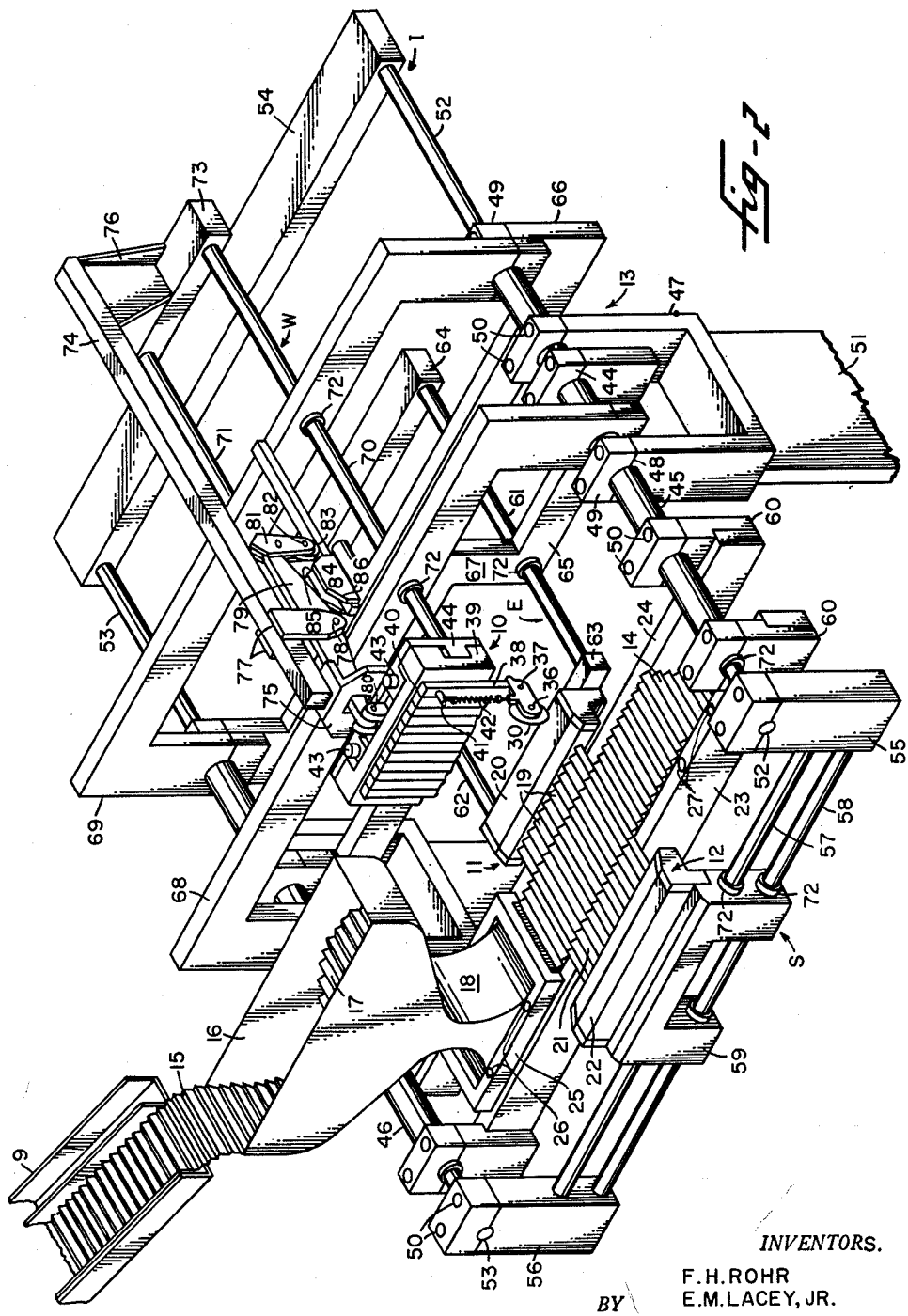
INVENTORS.
F. H. ROHR
E. M. LACEY, JR.
BY George E. Pearson
ATTORNEY

United States Patent Office 3,077,533
Patented Feb. 12, 1963

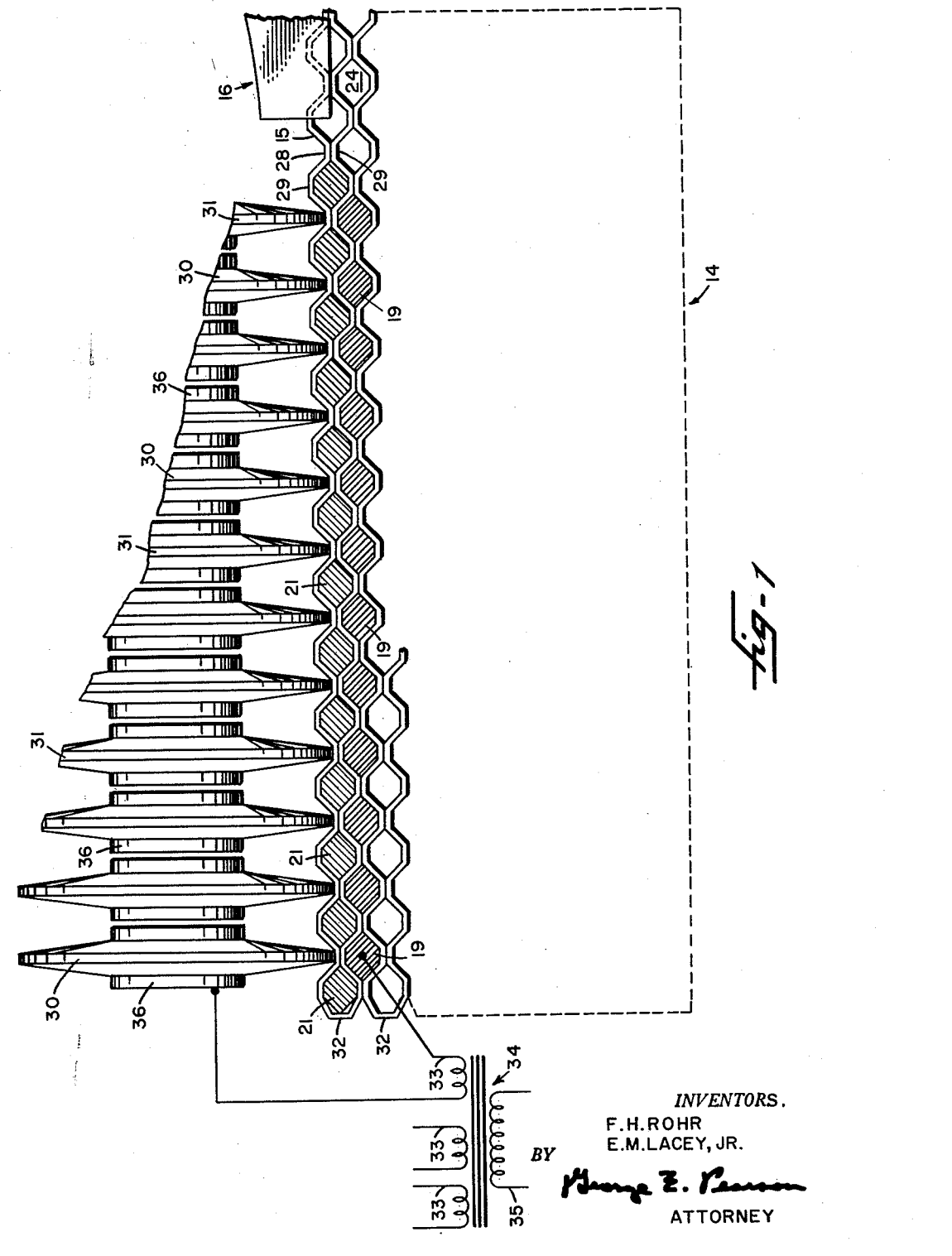

3,077,533
NOVEL FRAMEWORK FOR HONEYCOMB
CORE MACHINE
Fred H. Rohr, San Diego, and Elbert M. Lacey, Jr., Chula Vista, Calif., assignors to Rohr Aircraft Corporation, a corporation of California
Filed Apr. 17, 1961, Ser. No. 103,589
17 Claims. (Cl. 219—82)

This invention relates generally to a framework for supporting a multiple motion mechanism and more particularly to a novel framework having particular utility in a machine for fabricating honeycomb core structures.

Although not limited thereto, the framework of the present invention is particularly well suited for use in providing the basic welding pin, wheel, and core shuttling movements disclosed and claimed in the copending application of Fred H. Rohr for Method and Apparatus for Fabricating Honeycomb Core, Serial No. 846,903, filed October 16, 1959.

Many manufacturing processes—such as welding—require that several parts be brought together and assembled precisely at a work station; held thereat in such assembled relation for the duration of the welding period; and then shuttled out of the work area to make way for successive parts to be introduced, assembled, and acted upon therein. A situation of this type arises in the formation of so-called "honeycomb core" that is widely used in airplanes for low-weight, high-strength structure. In forming this honeycomb, strip feed and positioning means comprising internesting electrode and indexing pins juxtapose sections of corrugated metal ribbon or strips so that the troughs of one strip rest on the crests of another strip. The strips are then held in this position while coacting electrode pins and welding wheels pass the welding current through the abutting nodes of the adjacent crests and troughs to thus weld the same together and form cells of the honeycomb core. When selected crests and troughs have been welded together, the electrode pins and welding members are withdrawn from the thusly formed cells and, following shuttling of the core by the indexing pins, are re-inserted and re-applied as the process is repeated, as necessary, to complete the core.

For a completely satisfactory result, providing high quality honeycomb core, the juxtapositioning of the strip sections must be very precise; the pressure, movement, and electrical contacting of the welding members must be critically controlled; and the precision positioning, alignment, and movement of parts must persist repetitively in the cell-to-cell formation throughout the length and width of the core. Therefore, the framework structures and surfaces that support and guide the positioning and welding members must be strong, sturdy, carefully aligned; and must retain their relationship.

Various honeycomb core machines have heretofore been devised and used with varying degrees of success. In the past, for example, the guiding surfaces for such machines usually took the form of dove-tailed members in the form of ways and gibs which slide along complimentary surfaces. For such a structural arrangement, reference is directed to the aforesaid copending application of Fred H. Rohr, Serial No. 846,903. This type of guiding surface and supporting structure requires thick, massive and heavy members to assure rigidity; and as a result the mechanism becomes so heavy as to require a massive supporting framework.

Unfortunately, the massive framework structures of the prior art machines are not only cumbersome, unwieldy, and expensive to manufacture, but such form of structure makes it extremely difficult to reach interior portions of the mechanism to maintain and/or repair the elements thereat. Moreover, prior-art frameworks are usually such that the moving parts extend quite a distance in front of the frame, so that the operator cannot get close enough to the apparatus for adequate surveillance of the operation and to make adjustments, as required, as the machine performs its functions.

The nature of metallic honeycomb core and of the ribbons or strips of which it is fabricated, however, is not such that massive structures are required to adequately support the same in relation to the machine elements acting thereon during the fabrication process; nor are forces of the order of those usually employed to move massive structures required in the fabrication process. Actually, forces of relatively low order only are required in the handling of the thin metallic ribbons; in the movement of electrode and indexing pins into and out of the cells of the core; in the engagement and sweeping movements of the welding wheels with respect to the ribbon nodes to be welded; and the shuttling movements of the core itself. Moving parts of low mass and actuating forces of low order, therefor, preferably are employed, and the development of inertial forces thusly avoided, in order to minimize accidental or inadvertent deformation and damage to the core in the application of such forces to the work.

These and other factors and parameters are taken into account upon giving considered thought to the requirements of a honeycomb core machine capable of optimum performance. Appropriate attention is directed, for example, to the problem of maintaining effective bearing support and free sliding relationships between parts which must be relatively displaced over extended linear distances, such that binding between the displaced parts, and like occasions for the buildup and sudden release of inertial forces, are avoided.

The foregoing and other problems inherent in the construction and operation of a multiple motion mechanism such as a honeycomb core fabricating machine of the type herein contemplated are obviated in accordance with the novel combination, construction, and arrangement of parts comprising the framework of the present invention. In accordance with this arrangement and inventive concept, multiple longitudinal and transverse movements are rendered compatible and adjustable with respect to each other in a unitary, open, rigid, skeletal framework comprised of interconnected tube, rod, and like members, and subframes thereof, mounted for precision and ease of axial movement on linear bearings, or the like, all in the manner and for the purpose more fully to appear as the description proceeds.

An object of the present invention is to provide a new and improved framework for a multi-motion mechanism.

Another object is to provide a unitary skeletal framework for providing ease of movement and precision support for the basic welding pin and wheel movements of a honeycomb core fabricating machine.

Another object is to provide an open skeletal framework for the basic welding pin and wheel movements of a honeycomb core machine in which the framework principally comprises elongated circular members which extend longitudinally in the direction of the basic movements and other members which serve to maintain the circular members in spaced parallel relationship.

Another object is to provide an open skeletal framework support for the basic movements of a honeycomb machine in which the core being fabricated on the machine is in full view of and accessible to an operator in attendance at the machine and in which the various components of the machine are readily available for inspection, repair, and surveillance during operation.

Still another object is to provide a unitary skeletal framework for providing the basic pin and welding wheel movements of a honeycomb core machine in which the frame members are of such light weight as to avoid the build-up of inertial forces while at the same time providing adequate strength and rigidity to assure the desired ease and precision of the basic movements.

Still other objects, features and advantages of the present invention are those inherent in or to be implied from the following detailed description of an exemplary framework which has been constructed in accordance with the best mode thus far devised for practicing the principles of the invention, reference being had to the accompanying drawings wherein:

FIG. 1 is a fragmentary view, somewhat enlarged, of a honeycomb core in the process of being welded; and FIG. 2 is an isometric view of a framework which embodies the basic inventive concept of the present invention.

Referring now to the drawings for a more complete understanding of the invention, and first more particularly to FIG. 2, there is shown thereon a honeycomb core fabricating machine which is functionally equivalent to that disclosed and claimed in the aforesaid copending application of Fred H. Rohr, Serial Number 846,903, that is to say, both machines have the same basic components and the same basic movements. Thus, both machines comprise a welding wheel assembly or welding head generally designated 10, an electrode pin assembly 11, an indexing pin assembly 12, and a supporting framework generally designated 13. A core in the process of fabrication on the machine is generally designated 14 and is built up from an endless corrugated ribbon 15 which is supplied from a source (not shown) such as the strip feed and corrugating apparatus disclosed and claimed in the copending application of Elbert M. Lacey, Jr. for Method and Apparatus For Feeding Metal Strips, Serial Number 78,720, Filed December 27, 1960. The ribbon so supplied is received by way of a suitable chute or slide 9 and a wine glass shaped feed control device 16 which forms a hopper in its upper portion into which the ribbon 15 may fall into one or more loops such as indicated at 17. Feed control device 16 also has a narrowed throat portion 18 providing a restricted opening which approximates the thickness of the corrugated ribbon, that is to say, the dimension corresponding to the depth of a trough or the height of a crest, as the case may be. The restricted opening serves to keep the ribbon supplied to the core under sufficient tension, short of stretching and deforming the same, such that the ribbon nodes fall naturally into alignment with the confronting nodes of the previously formed core layer. On leaving the throat 18, the ribbon is fed and guided outwardly of the device 16 through the open bottom thereof in either direction longitudinally of the core and into what becomes the upper layer of the core as the same is shuttled in either direction to the right or to the left of the machine.

The electrode pins 19 move axially into and out of what constitutes the upper row of completed cells of the core 14, and the indexing pins 21 move axially into or out of what constitutes those cells which are being newly added to the core upon welding of the ribbon 15 thereto.

Electrode pins 19 which in the specific case, as shown, may be 12 in number, are precisely formed and precisely mounted and spaced in a header member 20 to which they are suitably secured as by being potted in a body of suitable plastic such as an epoxy resin molded within the member 20. When so formed, the electrode fingers or pins 19 closely fit the cell configuration, as may be seen in FIG. 1, but may be freely moved axially thereof into or out of the cells of the core 14. Indexing pins 21 are similarly formed and precisely spaced and mounted in a header member 22 comprising the indexing pin assembly 12.

Electrode pins 19 lie generally within the plane of the cells of the core 14 formed by the previous welding thereto of a length of ribbon 15 extending along the length of the core. The indexing pins 21 are disposed in internesting relationship with the electrode pins 19 and are disposed generally in a plane spaced one-half cell width above the plane common to the electrode pins. As otherwise expressed, the indexing pins are disposed generally in a plane of those cells which are being newly added to the core to form the upper layer of cells thereof.

Both the electrode and indexing pins are mounted for movement axially thereof into and out of the cells of the core, and the electrode pins when so inserted into the core, are in supporting relation with respect thereto, the core being depended from these pins and supported, at least in part, therefrom. The indexing pins 21, on the other hand, when inserted into position on the core, are disposed beneath a section of the corrugated ribbon 15 which is to be welded to the core and, consequently, do not initially provide a support function for the core. When the welding of this ribbon section has been completed and the same is secured to the core, and when the electrode pins have been withdrawn axially from the core, the core is then supported by the indexing pins such that the core may be shuttled by movement of the indexing pin assembly 12 to the right or to the left, as the case may be.

With the parts in the positions as shown in FIG. 2, the machine is so set up that upon being set in operation, the core 14 would be shuttled in successive increments of 12 cells each to the right. Assuming, for example, that the welding wheel assembly 10 has just returned from a sweep across the ribbon section disposed above the pins 19 and 21 such that this ribbon section has been welded to the core, the electrode pins 19 are then withdrawn from the core, or may have been withdrawn from the core upon the return sweep movement of the welding wheel assembly 10. On removal of the electrode pins 19 from the core, the same is supported by the indexing pins 21 and may be shuttled to the right as a unit with the indexing pin assembly 12. On shuttling the core, an additional length or section of ribbon 15 is withdrawn from the feed control device 16 and assumes a position of alignment with the confronting nodes of the corresponding section of the upper ribbon of the core. The electrode pins are then reinserted into the core beneath the last mentioned ribbon section, following which the indexing pins are withdrawn axially from the core and the assembly 12 returned to the area of the welding station. The indexing pins are then inserted beneath the newly superimposed section of ribbon 15 which is to be welded to the core in the next cycle of operation of the welding machine.

When the core has been shuttled completely to the right such that the last core section or increment of cells at the extreme left end of the core have been formed at the welding station, both sets of electrode and indexing pins 19 and 21 are withdrawn axially from the core and the core is lowered by one-half cell width following which the pins are again inserted into the confronting cells of the core. The wine glass control device 16 is then moved from the position shown to the right side of pins 19 and 21 into a position comparable to that disclosed on the left side of the pins, that is to say, device 16 will be similarly supported on stripper bars 23 and 24 between which the core 14 builds up layer by layer as the same is lowered one-half cell width at a time from the pins 19 and 21. The base 25 of device 16 carries a pair of spaced dowel pins 26 which are adapted to be received in openings 27 in stripper bar 23 to assure proper positioning of the device 16 on the stripper bars on either side of the pins 19 and 21.

As the device 16 is moved to the right side of the pin assemblies, an additional length of the ribbon 15 is withdrawn therefrom and doubled back over that portion which has just previously been welded to the core, and this new section of ribbon falls naturally into alignment therewith, node for node, as aforedescribed. The machine is then in position for shuttling of the core by increments to the left to add the next layer of cells to the core. When this layer has been completed, the extreme right end section of the core is positioned at the welding station and the core is again lowered one-half cell width and feed control device 16 returned to the left side of the pins 19 and 21, as shown, to thus complete an overall cycle of operations of the machine.

This overall cycle thus, by way of review, includes shuttling of the core in one direction over the length thereof to complete one row of cells of the core followed by shuttling of the core in the reverse direction and over the length thereof to form a second row of cells of the core. The core so fabricated, may be made to any desired length and may be built up row-by-row to any width within the space limitations of the environmental surroundings of the machine. When desired, moreover, the machine may be shuttled continuously in either direction and the core returned upon itself to form an endless belt.

Referring now more particularly to FIG. 1, it may be seen that the corrugated ribbon 15 has flattened troughs 28 and crests 29 which form aligned and abutting nodes 28, 29 of adjacently disposed and oppositely corrugated ribbon sections. As otherwise expressed, these adjacent and oppositely corrugated ribbon sections are displaced relative to each other by one half the spacing between corrugations, or by one half the length of a cell as measured longitudinally of the core, with the result that the crests of one section are aligned and abutted with the troughs of the other. Upon welding together of these abutting nodes, generally diamond-shape cells of square configuration are formed, but for the flattened crests and troughs which tend to give the cells a hexagonal configuration.

The aligned and abutting nodes 28, 29 to be welded are juxtaposed and supported on the electrode pins 19 whose upper surfaces are appropriately matched to conform with the under surfaces of the crests 29. The upper surfaces of the adjoining troughs 28 are electrically engaged by the welding wheels 30 whose peripheral rim portions provide an engaging surface area 31 whose width may be of the order of ¼ the nodal width. Thus, in a specific case, the wheel rim perimeter 31 may be 0.10 inch wide and the nodal width approximately 0.04 inch. This allows for limited wandering or deviation of the wheels 30 from the intended welding swath to be laid down thereby when the welding current passes between the wheels and electrodes as the wheels sweep along the aligned and abutting nodes and across the adjacent ribbon sections to be welded together.

In order to hold the welding swath or track along the nodes substantially within the allotted dimensional width, the wheels must be precision formed and rotatively mounted, and the alignment of the abutting nodes likewise must be precisely arranged. This, in turn, requires that the spacing between pins, both indexing and electrode, be accurately established and maintained repetitively in the course of the several pin and wheel movements which must take place with each cycle of operation of the machine.

The electrode pins, as aforenoted, serve to align the crests 29, but it is one of the functions of the internesting indexing pins to assure that the abutting troughs 28 are properly aligned and juxtaposed therewith and this, in turn, assures that subsequently, the electrode pins will be properly received into the cells previously formed about the indexing pins.

The core so formed from cell to cell and layer to layer comprises an integral length, or spliced continuous length of ribbon 15 which, as aforedescribed, is doubled back upon itself at each end of the core as indicated at 32, as each new layer of cells is to be added to the core. When so doubled back over the indexing pins 21, as shown in internesting relation with respect to the electrode pins 19 in FIG. 1, the precision forming of the corrugations in the ribbon 15 and the precision forming and spacing of the internesting pins combine to assure that the abutting nodes will juxtapose and align relative to each other and with respect to the electrode pins. The end result is high quality core of uniform and consistent cellular configuration and of virtually limitless length and breadth.

The uniformity and consistency of the welds also contribute to the quality and strength of the core and this, again, depends on the extent to which the internesting pins effect the desired alignment, abutment and general juxtaposition of the nodes with respect to the electrode pins. The tracking and pressure of the welding wheels are further factors contributing to the achievement of satisfactory welds, as are the parameters of the welding circuit.

It suffices to state herein that the electrode pins 19 are formed of highly conductive material and precisely spaced and embedded in plastic insulation in the head 20. Each pin 19 is separately brought out and connected to a transformer secondary winding 33, the other terminal of which is connected to the coacting electrode wheel 30, as indicated schematically in FIG. 1. The indexing pins are similarly embedded and thus precision spaced and electrically insulated but need not be so insulated or formed of conducting material since they have no electrical function.

Each electrode pin 19 and its associated coacting electrode wheel 30 are thus connected in circuits individual thereto in series with a secondary transformer winding 33. In the specific disclosure of 12 welding wheels and 12 electrode pins there preferably are employed 4 transformers such as the transformer 34 disclosed which has a primary winding 35 and 3 secondary windings 33. By reason of this arrangement, the welds laid down by each wheel are rendered independent of any circuit variations such as may be experienced by the circuits individual to the other wheels. In prior art arrangements wherein the wheels may be connected in series or in parallel arrangements, variations in the node contact pressures or wheel contact pressures produce variations in the resistance of the welding current paths with the result that an unfavorable weld condition experienced by one of the number of series connected wheels may lessen the welding current and prevent satisfactory welds by the others or, in the case of parallel connected wheels, the welding current due to a burning through or shorting of one of the wheels may reduce the current to other below that required for satisfactory welds.

Each of the wheels 30 is rotatively mounted on a pivoted member 36 which, in turn, is pivotally connected as at 37 to a vertically disposed member 38 to which the transformer lead may be connected. Member 38, as well as those individual to the other wheels 30, are separately secured to and insulated from a common member 39 by means of suitable intervening insulation designated 40.

Each member 38 has a horizontally direction pin 41 against which a compression spring assembly 42 is urged, the other end of this assembly being urged against wheel pivot member 36 with the result that the wheel is urged by its spring assembly to move in a downwardly direction.

Wheel support member 39 has a plurality of vertically directed pins 43 which are received slidably in suitable openings provided therefor in a fixed member head 44, these parts collectively constituting the welding head 10. The wheels 30 and their common support plate 39 may thus be lowered relative to the fixed plate 44 to bring the wheels into engagement with the abutting nodes, and further lowering movement of the member 39 after the wheel engagement is thus established, causes predetermined compression of the spring assembly 42 to thus provide a required contact pressure of the wheels on the associated nodes.

The success of the welding operations and the quality of the fabricated core depend in large measure upon the precision with which the welding head 10 and the electrode pin and indexing pin assemblies 11 and 12 may be moved repetitively to engage the ribbon and core and to shuttle the core following the welding of each series of aligned and abutting nodes. The precision of these movements also depend upon the framework support for the assemblies 10, 11, and 12. This framework 13 comprises a main frame and several subframes presently to be described.

The main frame comprises two basic structural members in the form of a pair of spaced parallel tubes 45 and 46 the inherent rigidity and torsional strength of which provides basic support for the other structural members of the machine, and by reason of the telescopic nature of the tubes serves to slidably support the subframe designated I upon which the indexing fingers 21 are mounted for axial movement, as will presently appear. The structure for supporting the tubes 45 and 46 with respect to a support surface such as a table top or floor surface may be of any suitable type, and as shown, comprises for each of the tubes a U member 47 the spaced legs of which provide space support for the tubes. The extremity of each leg of U member 47 is apertured to receive its engaging tube and each leg is severed along a diameter of the tube as indicated at 48 to provide complementary gripping surfaces to clamp the leg to the tube, the severed extremity 49, for this purpose, be secured to the main leg portion as by suitable threaded fasteners 50. This manner of clamping various structural members to the tubes and to like members of circular cross section is employed throughout the several parts of the framework and, accordingly, this clamping feature will not again be described in detail.

Each U member 47 has secured thereto in any suitable manner an upright member 51 and such additional base structure (not shown) as may be required to support the machine above the support surface, as aforedescribed.

Slidably supported within tubes 45 and 46 are a pair of elongated rods 52, and 53 respectively which extend beyond either end of the tubes. At the rear end of the tubes, rods 52 and 53 are interconnected by a cross member 54 which has openings for receiving the rods interfittingly therewith and has substantial width axially of the rods so as to effect a rigid rectangular subframe therewith, hereinbefore generally designated I. This rigid rectangular subframe is completed at the forward extended ends of rods 52 and 53 by a second rigid rectangular frame designated S and comprising a pair of depending members 55 and 56 which are respectively clamped to the ends of rods 52 and 53. These depending members, in turn, are rigidly interconnected by a pair of spaced parallel rods 57 and 58.

Slidably supported on rods 57 and 58 is an inverted U member 59 whose legs are suitably apertured to slidably receive the rods. The base of slide 59 is suitably formed to provide for interfitting engagement with indexing pin head 22 to which it is preferably secured detachably in any suitable manner. The spacing between tubes 45 and 46 and rods 52 and 53 is such that slide member 59 and the indexing pins and head supported thereon may be moved fully to either side of the electrode pins when the same have been withdrawn axially from the indexing pins, thereby to shuttle the core 14 by an increment of 12 newly formed cells of the core. This shuttling space to the left of the machine, with the parts in position as shown in FIG. 2, is occupied by the ribbon feed control device 16 and, accordingly, the shuttling of the core, as shown, occurs to the right of the machine. When the indexing head 12 has been moved into this shuttling space on the right of the machine, the subframes I and S are readily moved as a unit forwardly of the machine by reason of the free sliding movement of the rods 52 and 53 in the spaced parallel tubes 45 and 56. This movement of these subframes causes axial withdrawal of the indexing pins 21 from the core, and the indexing head and its slide support 59 may then be slidably moved along rods 57 and 58 to restore the indexing head to the welding station at which time the subframes I and S may be moved as a unit rearwardly of the machine for re-engagement of the indexing pins with the core and internesting engagement with the electrode pins 19.

Each of the stripper bars 23 and 24 at each end thereof, has secured thereto and extended upwardly therefrom a member, the upper end of which is formed as heretofore described for clamping engagement with the associated tube 45 or 46 as the case may be. This clamping arrangement readily permits of adjustment of the stripper bars 23 and 24 axially of the tubes 45 and 46 to thus accommodate between the stripper bars variable core thicknesses within limits imposed by the over lapping length of the indexing and electrode pins. It will be understood, moreover, that indexing and electrode heads 11 and 12 having different finger lengths may be installed on the machine to thus provide for variable core thicknesses, as measured in terms of the width dimension of the ribbon 15, of the order of upwards of 5 inches.

In the manner heretofore described for the indexing pin subframe I, there is provided a similar subframe designated E for the electrode pins 19. Subframe E thus similarly comprises a pair of spaced rods 61 and 62 which, at their forward ends, are interconnected by a cross member 63 to which they are rigidly secured in any suitable manner. Cross member 63 serves to support the electrode pin head 20 to which it is secured preferably detachably by any suitable means (not shown). The other end of rods 61 and 62 are interconnected by a cross member 64 to which they are rigidly secured, cross member 64 being generally similar, and its manner of attachment to rods 61 and 62 being generally similar to the construction and arrangement heretofore described in connection with cross member 54 of subframe I.

Subframe E is mounted for free sliding movement and axial movement of the electrode pins 19 parallel to the axes of tubes 45 and 46 by means of a pair of spaced parallel cross members 65 and 66 which interconnect the tubes and are clamped at the ends thereof to the tubes, the clamping arrangement being as heretofore described in connection with main frame support member 47. Rods 61 and 62 are mounted for free sliding support in openings suitably provided therefor in cross members 65 and 66, these openings being aligned such that the rods in their sliding movements move parallel to the axes of tubes 45 and 46.

Cross members 65 and 66 are generally C-shaped and generally depend from the spaced tubes 45 and 46. Cross member 65, however, in that central portion 67 thereof extending between spaced parallel rods 61 and 62 is directed upwardly to provide a clearance space for electrical cables which individually connect to and terminate at the electrode pins 19.

An additional pair of generally C-shaped spaced parallel cross members 68 and 69 interconnect tubes 45 and 46 and are clamped thereto as heretofore described. These C-shaped cross members are directed upwardly relative to the tubes and provide the sliding support for the welding rectangular subframe W which, in a manner similar to the other subframes, comprises a pair of spaced parallel rods 70 and 71 which are mounted for sliding movement parallel to the axes of the tubes 45 and 46. The rear end of rods 70 and 71 are interconnected by a cross member 73 to which they are rigidly secured, and the forward ends of these rods have the fixed welding head member 44 secured thereto, preferably by detachable means (not shown). By reason of this sliding movement for welding subframe W, the same is constrained to move parallel to the axes of tubes 45 and 46 to thus assure that the wheels 30 are directed with precision along and parallel to the aligned and abutting nodes juxtaposed upon the electrode pins 19.

Welding subframe W provides support for a longitudinally extended member 74 which is secured in elevated position above this subframe by means of fore and aft members 75 and 76 which are secured respectively to head member 44 and cross member 73. A pair of vertically disposed members 77 depend from either side of member 74 to which they are secured and provide as at 78 a pivot support for a lever 79, the front end of which is pivotally secured as at 80 to the vertically movable portion 39 of the welding head. The other end of lever head 79 has secured thereto on either side thereof a pair of vertically disposed depending members 81 which provide a pivotal support as at 82 for a cam follower wheel 83. Wheel 83 is mounted in cooperative relation to a cam 84 having rise and fall surfaces 85 and 86 which are spaced in accordance with the width of ribbon 15. Cam 84 is supported on cross members 68 and 69 to which it is suitably extended and interconnected. By reason of this arrangement, sliding movement of the welding subframe W to sweep the wheels across the ribbon also causes, by reason of the coaction between wheel follower 83 and cam 84, a downward movement of the vertically movable cam head portion 39 with the result that the wheels 30 first engage the aligned ribbon nodes and thereafter build up a desired contact pressure therewith as the spring assemblies 42 are compressed by further lowering movement of head member 39.

The ease of the free sliding movement of subframes I, S, E, and W is greatly facilitated by the use of linear bearings 72 which are employed within tubes 45 and 46, on shuttle slide member 59, and on cross members 65, 66, 68, and 69. Such linear bearings are well known and may be of any type suitable for the purposes such, for example, as those manufactured and sold by the Thompson Ball Bushing Company whose XA122026 linear bearings are particularly well suited for the purpose.

From the foregoing, the operation of the core fabricating machine as herein disclosed should now be fully apparent and, likewise, the features and functions of the framework and subframes in assuring the desired precision of movement of the welding head and electrode and indexing pin assemblies should also be apparent to thus fulfill the aforestated objects and features of the invention. It will be apparent, for example, that the mechanisms of the machine lie largely to the rear of the ribbon and core being fabricated to thus place the fabrication process substantially in full view of and available for ready access of an operator in attendance at the machine. The open skeletal framework, moreover, not only constitutes a light weight structure, but presents the moving mechanisms and parts in full operative surveillance and for ready access in case of need for repairs.

While the invention here involved has been embodied in a single disclosed preferred form, it will be apparent to those skilled in the art to which the invention most closely relates or appertains that the same may be embodied in other forms or carried out in other ways without departing from the spirit or essential characteristics thereof. The present embodiment of the invention is therefore to be considered as in all respects illustrative and not restrictive, the scope of the invention being indicated by the appended claims, and all changes that come within the meaning and range of equivalency of the claims are intended to be embraced therein.

Having best described our invention, what we claim as new and useful and desire to secure by Letters Patent is:

1. In apparatus for forming honeycomb core from corrugated metallic ribbon, the combination with internesting indexing and electrode pins and coacting welding wheels of a framework comprising a main support frame including a pair of fixed spaced parallel tubes, means including a pair of members respectively slidably mounted within said tubes for supporting said indexing pins for axial movement parallel to the axes of said tubes, means mounted on said tubes for supporting said electrode pins for axial movement into and out of internesting relation with respect to said indexing pins and in supporting relation with respect to each of a plurality of aligned and abutting ribbon nodes of a pair of ribbon sections supported respectively on said internesting electrode and indexing pins, means mounted on said tubes for supporting the welding wheels for movement of the same along said abutting nodes in electrical engagement therewith, and means mounted on said pair of members for supporting said indexing pins for movement transverse to the axes thereof when the indexing and electrode pins have been withdrawn axially from said interesting relation with respect to each other.

2. In apparatus as in claim 1, said members comprising a pair of elongated rods extending outwardly from either end of the tubes and mounted for free sliding movement axially of the tubes, a cross member connected to the extended ends of said rods disposed at one end of said tubes, a pair of members depended respectively from the other extended ends of said rods and respectively secured thereto, a pair of spaced rods extended between said depending members and secured thereto, and means supporting said indexing pins in mutually spaced relation for mounting said pins for movement slidably along said last named rods.

3. In apparatus as in claim 1, said electrode pin mounting means comprising a pair of cross members interconnecting said tubes and disposed in spaced parallel relation axially of the tubes, a pair of spaced parallel rods disposed parallel to said tubes and mounted on said spaced interconnecting members for free sliding movement with respect thereto axially of the rods, a cross member interconnecting said rods at one end thereof, and means secured to said rods at the other end thereof for supporting said electrode pins in mutually spaced relation.

4. In apparatus as in claim 1, a pair of cross members interconnecting said tubes and mounted thereon in spaced parallel relation axially of the tubes, a pair of spaced parallel rods disposed parallel to said tubes and mounted on said interconnecting members for free sliding movement with respect thereto axially of the rods, a cross member interconnecting said rods at one end thereof and means secured to said rods at the other end thereof for supporting said welding wheels in mutually spaced relation.

5. In apparatus for forming honeycomb core from corrugated metallic ribbon, the combination with internesting indexing and electrode pins and coacting welding wheels of a framework comprising a main support frame including a pair of fixed spaced parallel tubes, a pair of elongated rods extended outwardly from either end of the tubes and mounted for free sliding movement axially of the tubes, a first cross member connected to the extended ends of said rods disposed at one end of said tubes, a pair of members depended respectively from the other extended ends of said rods and respectively secured thereto, a second pair of spaced rods extended between said depending members and secured thereto, means supporting said indexing pins for movement slidably along said second pair of rods, a first pair of mutually parallel cross members interconnecting said tubes and disposed in spaced relation axially of the tubes, a third pair of spaced parallel rods disposed parallel to said tubes and mounted on said first pair of cross members for free sliding movement with respect thereto axially of the rods, a second cross member interconnecting said third pair of rods at one end thereof, means secured to said third pair of rods at the other end thereof for supporting said electrode pins in mutually spaced relation and for axial movement into and out of internesting relation with respect to said indexing pins and in supporting relation with respect to each of a plurality of aligned and abutting ribbon nodes of a pair of ribbon sections supported respectively on said internesting electrode and indexing pins, a second pair of mutually parallel cross members interconnecting said tubes and mounted thereon in spaced relation axially of the tubes, a fourth pair of rods disposed parallel to said tubes and mounted on said second pair of cross members for free sliding movement with respect thereto axially of the rods, a third cross member interconnecting said fourth pair of rods at one end thereof, and means secured to said fourth pair of rods at the other end thereof for supporting said welding wheels in mutually spaced relation and for movement of the same along said abutting nodes in electrical engagement therewith, said electrode pins being withdrawn axially from said internesting relation with respect to the indexing pins upon axial movement of said third pair of rods and said indexing pins being shuttled transversely to either side of said electrode pins upon sliding movement of said indexing pin supporting means on said second pair of rods.

6. In apparatus as in claim 5, said rods having linear bearing supports for slidably mounting the same with respect to their associated support means.

7. In apparatus as in claim 5, said first and second pairs of cross members comprising means for clamping the same to said tubes.

8. In apparatus as in claim 5, said main support frame comprising members secured to said spaced tubes for supporting and mounting the apparatus in operative relation with respect to a support surface.

9. In apparatus as in claim 1, said framework further comprising a pair of ribbon stripper bars extended transversely of said internesting pins beneath the same and in parallel spaced relation axially of the pins, and means secured to the ends of said stripper bars and depended from said tubes for adjusting the spaced parallel relationship of the stripper bars axially of the tubes in accordance with the ribbon width.

10. In apparatus of the character disclosed for forming honeycomb core from corrugated metallic ribbon, the combination with internesting indexing and electrode pins and coacting welding wheels of a supporting framework comprising a main supporting frame including a pair of fixed spaced parallel tubes, a first skeletal rectangular frame slidably mounted on said tubes for supporting said indexing pins for movement axially thereof and parallel to the axes of the tubes, and second and third skeletal rectangular frames slidably supported on said tubes for respectively supporting said electrode pin and wheel assemblies for movement parallel to the axes of the tubes to bring said electrode pins into internesting relation with respect to said indexing pins and for moving said welding wheels along aligned and abutting ribbon nodes supported on said internesting pins, and means supported on said first rectangular frame for slidably supporting said indexing pins for movement transverse to the axes thereof when the indexing and electrode pins have been withdrawn axially from said internesting relation with respect to each other.

11. In apparatus of the character disclosed for forming honeycomb core from corurgated metallic ribbon, the combination with internesting indexing and electrode pins and coacting welding wheels of a supporting framework comprising a base support frame including a pair of fixed space parallel tubes, first, second and third movable rectangular frames operatively mounted on said tubes and respectively supporting said indexing pins, electrode pins, and welding wheels for movements of the same parallel to the axes of the tubes into and out of internesting engagement of the indexing and electrode pins and of sweeping movement of the welding wheels thereover in electrical engagement with a plurality of aligned and abutting ribbon nodes of a pair of ribbon sections disposed in supported relation respectively on said indexing and electrode pins, and means slidably mounted on said rectangular frame individual to said indexing pins for shuttling the same transversely of the axes of the pins to either side of the electrode pins when the indexing and electrode pins have been relatively withdrawn from said internesting relation.

12. In apparatus as in claim 11, said framework further comprising spaced ribbon stripper means supported on said tubes and adjustably spaced therealong in accordance with the width of said ribbon sections.

13. In apparatus as in claim 4, said wheel support means comprising a first member secured to said rods and a second member having said wheels mounted thereon and movable vertically relative to said first member, cam follower means pivotally supported on said first member and said interconnecting member for moving said wheel support member vertically with respect to said support member, and cam means supported by said interconnecting members for actuating said cam follower means to move said wheels into electrical engagement with said abutting nodes as the wheels are moved along the nodes.

14. In apparatus of the character disclosed for forming honeycomb core from corrugated metallic ribbon, the combination with internesting indexing and electrode pins, coacting wheels, and a ribbon control feed device for feeding the ribbon into positions of alignment with said pins such that aligned and abutting ribbon nodes of adjacent ribbon sections are supported on said pins of a supporting framework comprising a base frame including a pair of fixed spaced parallel tubes, first, second, and third skeletal movable rectangular frames operatively mounted on said tubes and respectively supporting said indexing pins, electrode pins, and welding wheels and mounted for movement parallel to the axes of said tubes to bring the electrode and indexing pins into internesting relationship with the electrode pins disposed beneath said aligned and abutting nodes and to move said welding wheels along said nodes in electrical engagement therewith, means supported by the rectangular frame individual to said indexing pins for moving the same transversely of the axes thereof when the indexing and electrode pins have been withdrawn relative to each other from said internesting engagement, means adjustably supported on said tubes in accordance with the width of said ribbon sections for supporting said ribbon feed device in ribbon feeding relation to said internesting pins and on either side of said pins, and coacting means supported respectively on said tubes and on the skeletal rectangular frame individual to said welding wheels for moving the same into and out of said electrical engagement with said aligned nodes as the wheels are passed along the nodes and across said adjacent ribbon sections.

15. Apparatus as in claim 14, said first, second, and third skeletal rectangular frame each comprising a pair of spaced rods and linear bearing supports therefor to provide free sliding movement of said frames axially of their respective rods.

16. In apparatus as in claim 14, said framework comprising means for mounting said rectangular frames for sliding movement with respect to said tubes and including means for clamping said feed device support means to the tubes.

17. In apparatus of the character disclosed for forming honeycomb core from corrugated metallic ribbon, the combination with internesting indexing and electrode pins and at least one welding wheel of a framework comprising a pair of spaced parallel tubes, means mounted on said tubes for supporting said pins for axial movement into and out of mutual internesting engagement and in supporting relation to at least one pair of aligned and abutting nodes of said ribbon, means supported on said said tubes for supporting said wheel for movement over said aligned nodes in electrical engagement therewith, means supported on said tubes for supporting said indexing and electrode pins for relative shuttling movement transversely to either side of each other, and spaced ribbon stripper means adjustably supported on said tubes and adjustably spaced therealong in accordance with the width of said ribbon for passing said ribbon and core therebetween.

References Cited in the file of this patent
UNITED STATES PATENTS

| | | |
|---|---|---|
| 2,789,203 | Pigo et al. | Apr. 16, 1957 |
| 2,968,714 | Carter | Jan. 17, 1961 |